United States Patent
Püttmann

(10) Patent No.: US 8,944,189 B2
(45) Date of Patent: *Feb. 3, 2015

(54) ROD COUPLING HAVING A SACRIFICIAL ELEMENT

(75) Inventor: Franz-Josef Püttmann, Lennestadt (DE)

(73) Assignee: Tracto-Technik GmbH & Co. KG, Lennestadt (DE)

( * ) Notice: Subject to any disclaimer, the term of this patent is extended or adjusted under 35 U.S.C. 154(b) by 1320 days.

This patent is subject to a terminal disclaimer.

(21) Appl. No.: 12/594,691

(22) PCT Filed: Apr. 4, 2008

(86) PCT No.: PCT/EP2008/002706
§ 371 (c)(1),
(2), (4) Date: Feb. 18, 2010

(87) PCT Pub. No.: WO2008/122416
PCT Pub. Date: Oct. 16, 2008

(65) Prior Publication Data
US 2010/0150643 A1    Jun. 17, 2010

(30) Foreign Application Priority Data

Apr. 5, 2007  (DE) .......................... 10 2007 016 822
Apr. 5, 2007  (DE) .......................... 10 2007 016 824

(51) Int. Cl.
*E21B 17/02*     (2006.01)
*E21B 17/046*    (2006.01)

(52) U.S. Cl.
CPC ................................. *E21B 17/046* (2013.01)

USPC ........................... 175/320; 403/353; 403/348

(58) Field of Classification Search
USPC .................. 403/2, 292, 348, 353; 464/31–33; 175/320
See application file for complete search history.

(56) References Cited

U.S. PATENT DOCUMENTS

| | | | | |
|---|---|---|---|---|
| 709,762 | A * | 9/1902 | Greaves | 403/353 |
| 3,542,408 | A * | 11/1970 | Lowrey | 92/242 |
| 4,411,546 | A * | 10/1983 | Fischer | 403/23 |
| 4,422,794 | A * | 12/1983 | Deken | 403/330 |
| 4,986,690 | A * | 1/1991 | Cooksey | 403/319 |
| 5,088,853 | A * | 2/1992 | Reid | 403/330 |
| 5,114,261 | A * | 5/1992 | Sugimoto et al. | 403/122 |
| 5,188,539 | A * | 2/1993 | Langdon | 439/341 |
| 5,190,392 | A * | 3/1993 | Parma et al. | 403/171 |
| 5,547,032 | A * | 8/1996 | Wenzel | 175/73 |
| 5,588,771 | A * | 12/1996 | Scott et al. | 403/353 |
| 5,634,733 | A * | 6/1997 | Sperduti | 403/2 |
| 5,980,157 | A * | 11/1999 | Puttman | 405/184 |
| 7,097,762 | B1 | 8/2006 | Ruocco et al. | |
| 7,334,959 | B2 * | 2/2008 | Holthaus et al. | 403/293 |

(Continued)

FOREIGN PATENT DOCUMENTS

| | | |
|---|---|---|
| DE | 312 215 | 5/1919 |
| DE | 312667 | 6/1919 |

(Continued)

*Primary Examiner* — Joshua Kennedy
(74) *Attorney, Agent, or Firm* — Howard IP Law Group, PC

(57) ABSTRACT

The invention relates to a coupling system for rod segments for use in horizontal earth boring, wherein the ends of the rod segments are interlinked via a separate sacrificial element which can be used as a predetermined breaking point or which allows the rod segments to be pivoted relative each other.

13 Claims, 7 Drawing Sheets

(56) References Cited

U.S. PATENT DOCUMENTS

| | | | |
|---|---|---|---|
| 8,197,155 B2* | 6/2012 | Noh | 403/348 |
| 8,336,644 B2* | 12/2012 | Puttmann | 175/320 |
| 2003/0010539 A1 | 1/2003 | Wang | |
| 2005/0224259 A1 | 10/2005 | Bise et al. | |

FOREIGN PATENT DOCUMENTS

| | | |
|---|---|---|
| DE | 369 691 | 2/1923 |
| DE | 717 535 | 2/1942 |
| DE | 758 462 C | 6/1952 |
| DE | 886 283 C | 8/1953 |
| DE | 894 983 C | 10/1953 |
| DE | 21 09 622 A | 9/1972 |
| DE | G 83 21 096.2 | 10/1983 |
| DE | 196 08 980 C2 | 9/1997 |
| DE | 297 13 354 U1 | 2/1999 |
| DE | 199 18 530 A1 | 10/2000 |
| DE | 100 65 533 A1 | 7/2002 |
| FR | 1 396 440 A | 4/1965 |
| JP | 10018772 A | 1/1998 |
| JP | 2002339686 A | 11/2002 |

* cited by examiner

ROD COUPLING HAVING A SACRIFICIAL ELEMENT

CROSS-REFERENCES TO RELATED APPLICATIONS

This application is the U.S. National Stage of International Application No. PCT/EP2008/002706, filed Apr. 4, 2008, which designated the United States and has been published as International Publication No. WO 2008/122416 and which claims the priorities of German Patent Applications, Serial No. 10 2007 016 822.7, filed Apr. 5, 2007, and Serial No. 10 2007 016 824.3, filed Apr. 5, 2007, pursuant to 35 U.S.C. 119(a)-(d).

BACKGROUND OF THE INVENTION

The invention relates to a rod coupling as it is used for connecting rod assemblies for underground horizontal boring and trench-less installation or replacing of pipelines (horizontal boring hereinbelow).

In horizontal boring, individual rod assemblies are strung together, connected with each other and moved through the ground by means of a push, pull, or rotary drive. In the case of longer borings, the rod assembly includes multiple rod segments which are, in accordance with the progress of the boring, connected with or separated from each other, one at a time. The individual rod segment is of limited length and must be very short particularly when the boring takes place in a short building pit, for example a hopper, inspection chamber, or man hole. Such hoppers can have diameters of, in part, less than one meter.

Known rod assemblies have couplings of various construction, wherein screw thread couplings are widely used. Aside from the problem that screwing the threaded connections takes a relatively long time and requires clean threads, such connections are particularly disadvantageous in that they allow for rod assembly rotation during the boring progress in one direction only. In the case of, for example, a threaded connection with right-hand thread, rod assembly rotation can only take place in a clockwise direction since otherwise the threaded connection would separate by the boring process.

Therefore, plug-in couplings were developed in the prior art. In contrast to screw couplings, when using plug-in couplings, the problem of fixing the coupling in the coupling mouth after plug-in must be solved since the adhesion-based fixation possibility for the screw thread is not available.

DE 297 13 354 U1 teaches a rod coupling wherein a first coupling part is inserted into a second coupling part. To couple the rod assemblies in accordance with the disclosure of this design patent, the front free end of the first coupling part is pushed, under an angle of about 60° relative to the longitudinal axis of the second coupling part and from the top, into a channel-like receptacle of the second coupling part. Therein, hemispherical protrusions of the first coupling part engage recesses of the second coupling part. From this position, in which the two pipe endings are in an angular relation to each other, the first coupling part is pivoted into the recesses so that the first coupling part reaches the channel-like receptacle of the second coupling part where it is tightly received.

Subsequently, the connection is secured by a safety element in form of a safety sleeve.

DE 196 08 980 C2 and DE 199 18 530 A1 teach rod couplings without the known thread connection and which have at the front end of the rod segment to be coupled an axially protruding lug-like attachment piece that glidingly engages the back end of the preceding rod segment. For this purpose, the face side of the preceding rod segment has an axial slit with a groove into which the lug-like attachment piece can be pushed. Thereby, a journal-like protrusion is brought into a bearing bore of the slit via the groove. By pivoting the subsequent rod segment, the rod segment is moved from the angular plug-in position to the extended position and subsequently positioned in coaxial relation to the preceding rod segment. The axial position is only guaranteed in this position, whereas the lateral fixation is effected by the side walls of the rod segments. Alternatively, the lug-like protrusion is laterally inserted into the slit and then pivoted from the angular plug-in position into the extended position. To ensure that the journal does not fall out of the slit, lateral fixation is provided through protruding side walls of the rod segments, which prevent falling apart of the coupling in the extended position.

DE 100 65 533 A1 describes a coupling in which the rod segments are plugged together. Therein, corresponding ends of the rod segments are connected by parallel-shifting of the rod segment axes, whereby, during parallel-shifting, the rod segments have an angle of a<180° in relation to each other. Thereby, a first rod segment has a journal which engages a corresponding recess of a second rod segment. An undercut prevents the journal from falling out. After rotating in, the undercut engages a shoulder at the subsequent rod segment or prevents falling out through spring-loaded pins that engage a recess in the face side of the end of the subsequent rod segment.

The solutions proposed in the prior art secure the rod segment couplings against radial or axial falling apart by safety sleeves, safety protrusions, spring-loaded pins or by the principle of insertion and removal in an angular position during operation in the extended position.

SUMMARY OF THE INVENTION

Against this background, the invention is based on the object to provide a novel connection system for connecting horizontal boring rod assemblies to enable a secure fixation and to lower the costs, when replacing a defective rod assembly.

This object is solved by a connection system for horizontal boring rod assemblies in accordance with the independent claims. Advantageous refinements are the subject of the respective subclaims.

The invention is based on the idea of connecting the rod segments of a horizontal boring rod assembly not directly but via a sacrificial element.

Such a sacrificial element can serve as a wear part. In accordance with the invention, if, in operation, the play becomes larger with time due to the female coupling part (receptacle) becoming larger because of the wear and tear, a larger dimensioned sacrificial element can be used after a certain period of time so that a coupling with no play is obtained again. Hereby, the receptacle can also be refinished. During operation of the rod assemblies, considerable forces occur. If there is a material failure, an entire rod segment must be replaced in the prior art. With the coupling member in accordance with the invention, replacement is limited to the coupling member. In a particular embodiment, the sacrificial element can be constructed in such a way that it defines a predetermined breaking point, for example, based on material choice, dimension, or geometry. The sacrificial element can be embodied as a forging part. The sacrificial element can also be specially treated for corrosion or specially stored (drum parts), for example.

However, even without defect, the sacrificial element can merely allow for cost-effective replacement of the coupling, for example, when different rod couplings are to be connected to each other.

Replacement is particularly easy if the sacrificial element is embodied in such a way that it can be separated on both sides.

However, the connection system in accordance with the invention also allows for choosing different degrees of freedom or for pivoting the rod segments relative to each other. This can be accomplished in the vertical rod assembly plane by means of a journal-like coupling on at least one side of the sacrificial element. A spherical or partly spherical coupling allows for pivoting the rod segments relative to each other in further planes.

The sacrificial element can be fixated on one side in a rod segment against pivoting in order to increase the stability of the rod segment and in order to limit the pivotability to one side of the sacrificial element. The fixation can be realized by a form-fit elastic damper which consists of, e.g., hard rubber or which can be pre-loaded. This allows for a certain degree of mobility, which avoids stress on the material and yet allows for a fixation that improves handling since the sacrificial element stays aligned and does not assume an undefined position. However, the sacrificial element can also be fixated on one side in the rod segment by material union or interference fit.

In one embodiment, a journal coupling is provided, in which the geometric shape of the sacrificial element allows for insertion in a certain angular position (alignment angle) and, at the same time, ensures a fixation over a wide angular range in a corresponding receptacle.

Thereby, insertion can occur in both a radial direction and an axial direction. For this purpose, the geometry of the stop ridge and/or recess can deviate from a circular cross-section.

The stop ridge can be provided as a coupling part that is to be axially inserted into the recess. Thereby, in accordance with the invention, one section of the journal can have a flat area for axial fixation. In this case, the recess, the coupling mouth, or the insertion channel of the recess has a corresponding geometry that allows for inserting the journal in a certain angular position. If the stop ridge is located in the recess, then the stop ridge is secured against axial shifting as soon as it leaves the angular position of insertion due to the fact the geometries that allow for insertion or removal no longer align.

This invention does not preclude transfer of a radial or axial fixation via an additional tongue and groove joint wherein, for example, the groove and tongue have a pitch circle shape and wherein the groove is rotated into the tongue when the rod segments are being connected.

The coupling in accordance with the invention can be used with different kinds of rod assemblies. The coupling in accordance with the invention can also be used with a support device for redirecting the push or pull forces from the drive axis into the pipeline axis.

The rod assembly can be in the shape of a circular arc on both sides, i.e., concave/concave or concave/convex in order to match the shape of different support devices and/or in order to be operated in different curve directions.

In accordance with the invention, rod segments can be provided on both sides with sacrificial elements, or they can be on both sides provided with a coupling mouth. Sacrificial elements can be embodied accordingly.

BRIEF DESCRIPTION OF THE DRAWING

The invention will be explained in more detail below by means of an embodiment shown in the drawing.

The drawing shows.

DETAILED DESCRIPTION OF PREFERRED EMBODIMENTS

Figure 1:
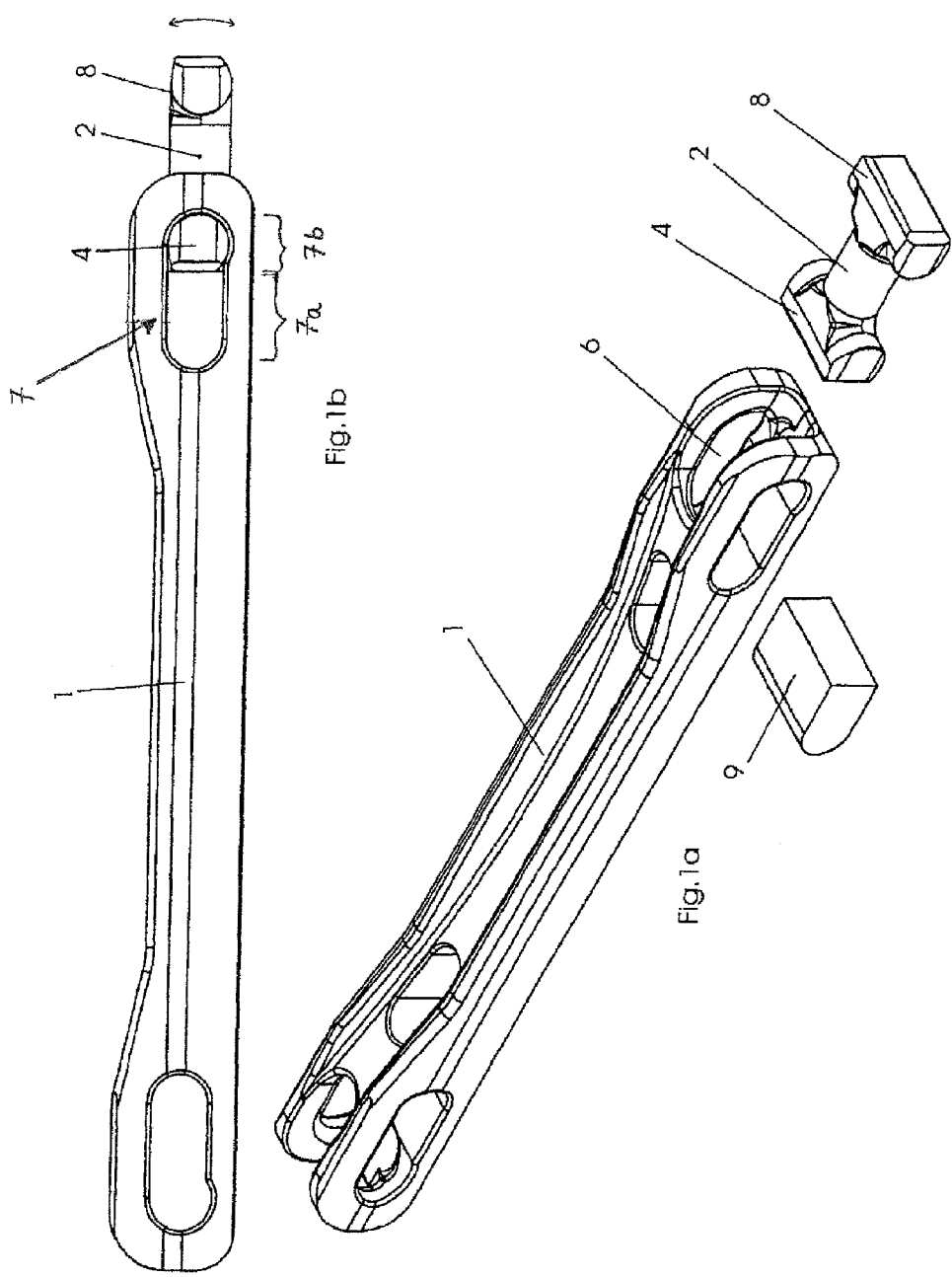
FIGS. 1a and b a coupling system in accordance with the invention having a sacrificial element in a rod segment (FIG. 1a) and the sacrificial element separate from the rod segment (FIG. 1b)

The plug-in coupling system connects at least two rod segments 1 to a second rod segment 2. For this purpose, a sacrificial element 2 with its stop ridge 4 is inserted, at one end of the rod segment 1, through a coupling mouth 6 into a recess 7. The recess 7 has first and second portions 7a, 7b of different widths. The stop ridge can be slid from the first portion 7a to the second portion 7b. Then, via a second stop ridge 8 of the sacrificial element, a second rod segment (not illustrated) is hinged on. The shape of the stop ridge allows for pivoting the rod segments relative to each other in one plane. By using a fixation block 9 as an elastic damper, the pivoting can be prevented or limited. Accordingly, the fixation block 9 is rigid or elastic.

Figure 2:
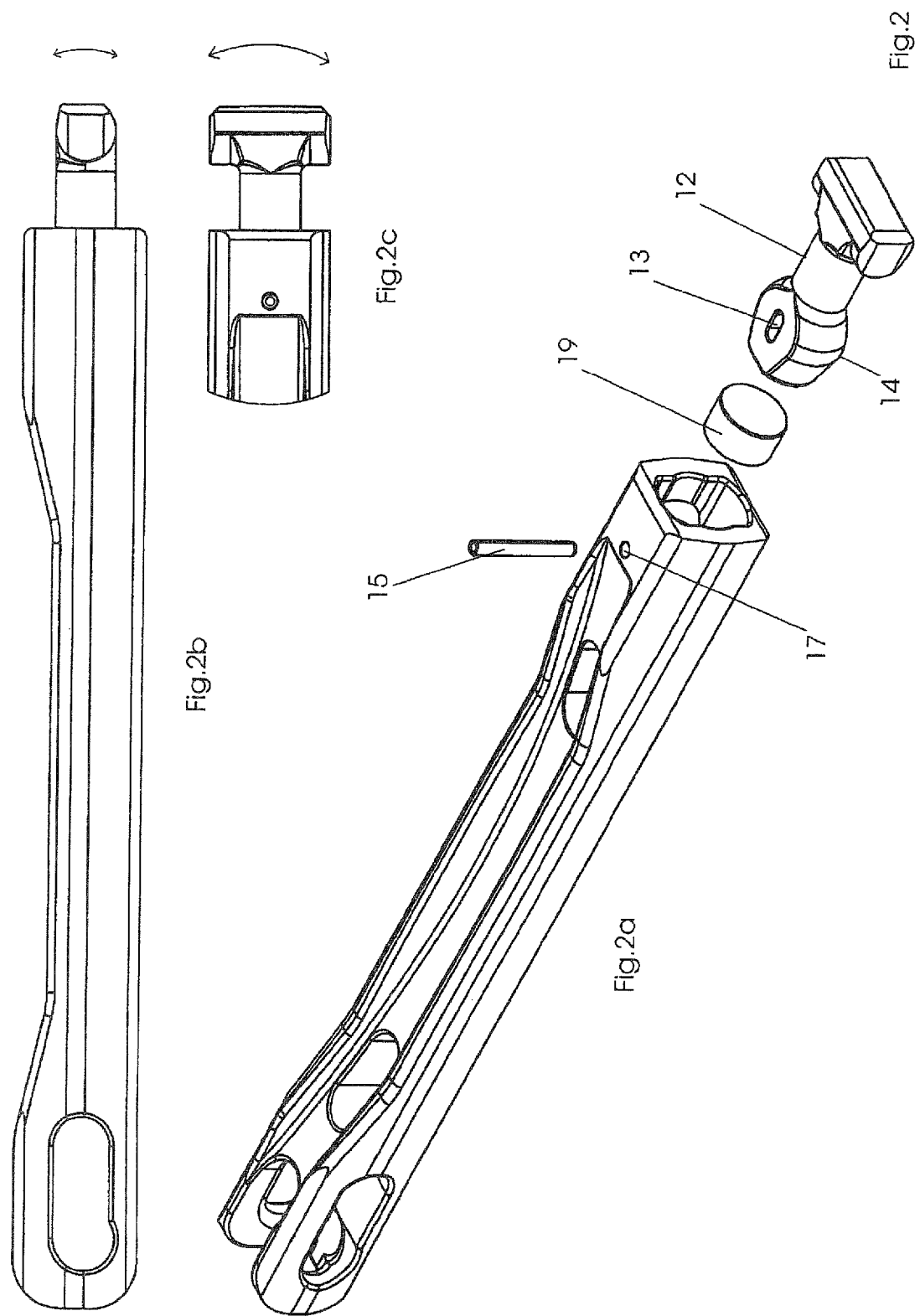
FIGS. 2a, b, and c an alternative embodiment of the plug-in system having an additional degree of freedom.

FIG. 2 shows an alternative embodiment in which the sacrificial element 12 has on one side a connection journal 14 having partly spherical shape. In addition, this embodiment has a longitudinal receptacle 13 for a safety pin 15, which is inserted into a corresponding opening 17 after assembly of the sacrificial element 12. The assembly is effected by insertion into the coupling mouth 16 and subsequent rotation by 90° and insertion of a vertical safety pin 15. The longitudinal receptacle 13 in the sacrificial element and the shape of the connection journal 14 allow for pivoting the sacrificial element in two planes (see FIGS. 2b and 2c). Again, a fixation block 19 determines the pivoting radius.

Figure 3:
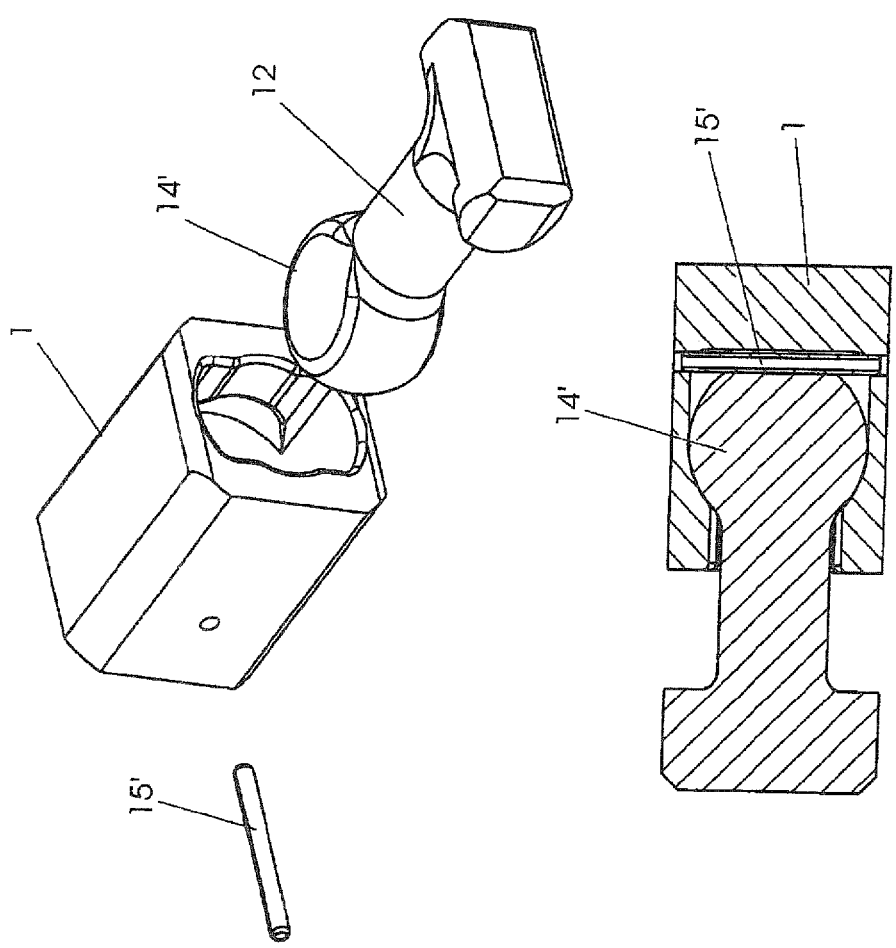
FIG. 3 an embodiment of a plug-in system with further degrees of freedom by using a spherical sacrificial element.

FIG. 3 shows an alternative embodiment with a connection journal 14' having a partly spherical shape in which additional degrees of freedom exist but which can also be secured against rotation and sliding out by a lateral safety pin 15'. Depending on the position of the safety pin, the pivotability can be maintained in all degrees of freedom.

Figure 4:
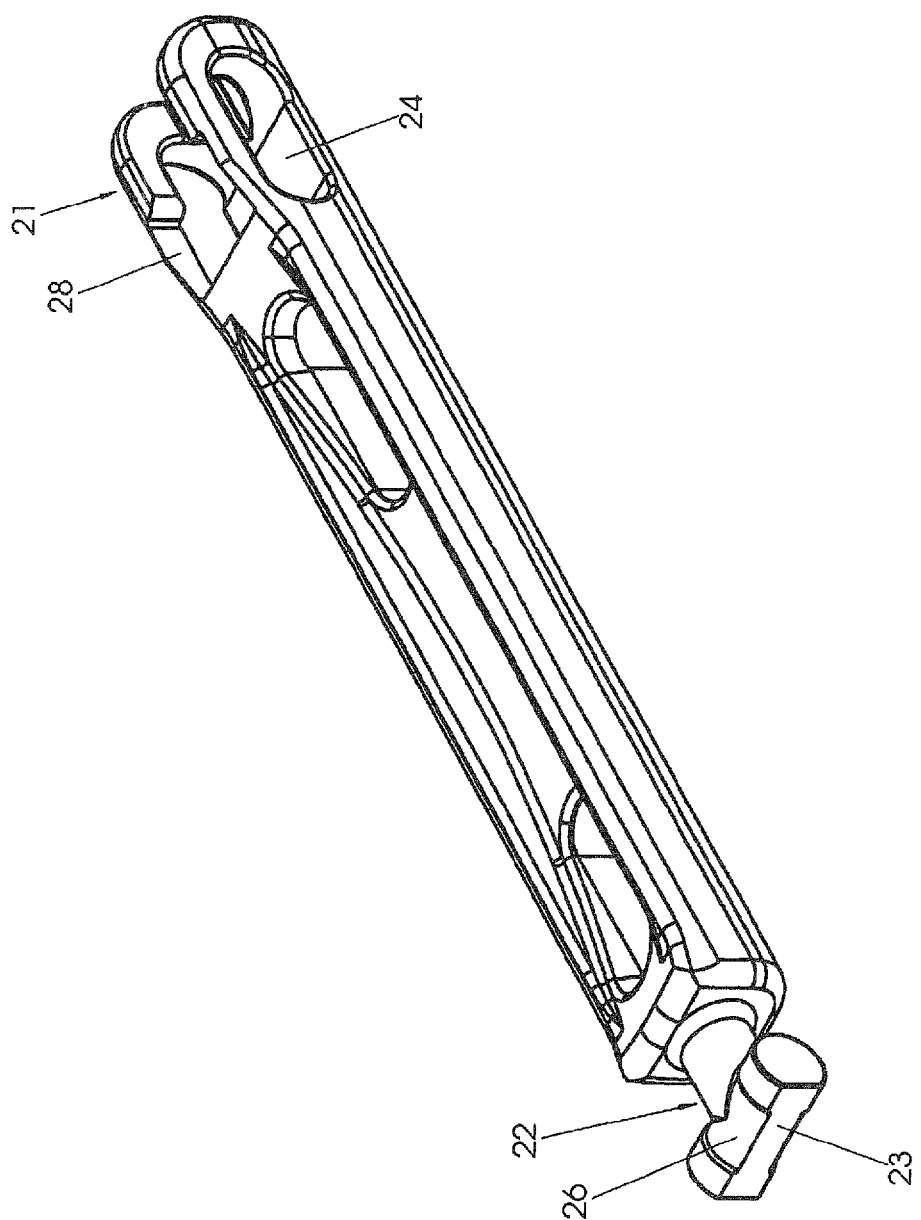
FIG. 4 an alternative embodiment of the invention with a sacrificial element that is connected to a rod segment via material union.

FIG. 4 shows an embodiment in accordance with the present invention in which a first stop ridge 26, which has a flat area 23 on its face side and which is located at the first sacrificial element 22, is axially inserted, via a longitudinal ridge 24, into a transverse recess 28 located at the rod segment 21. Due to the flat area 23 on the face side at the stop ridge 26, the rod segments are positioned at an angle of 90° relative to each other when the stop ridge 26 is inserted into the transverse recess 28. The circular cross-section of the transverse recess 28 ensures that a secure hold of the stop ridge 26 in the transverse recess 28 for all other angles up until the extended position.

Figure 5:
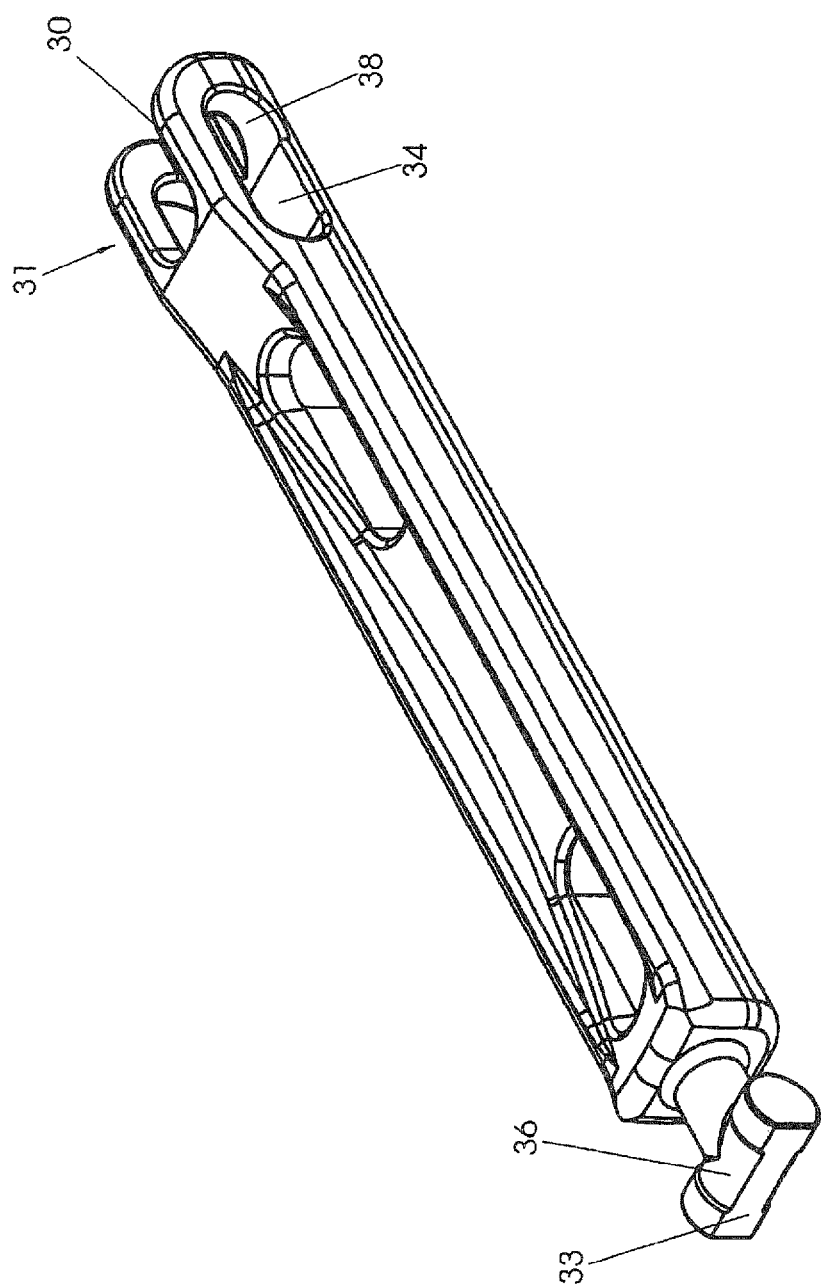
FIG. 5 a further embodiment of the invention with a sacrificial element that is connected to a rod segment via material union.
Figure 6:
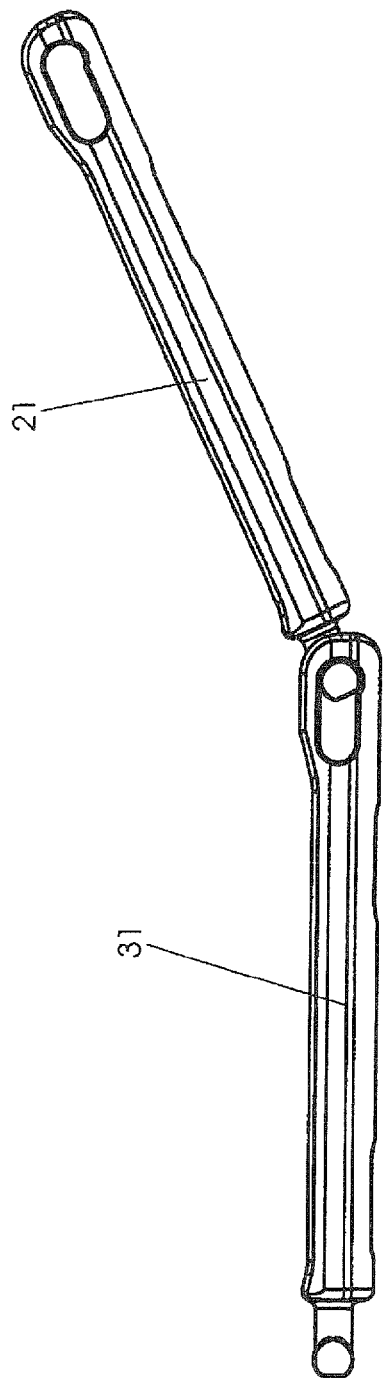
FIGS. 6 and 7 the embodiment of FIG. 5 in different assembly positions.
Figure 7:
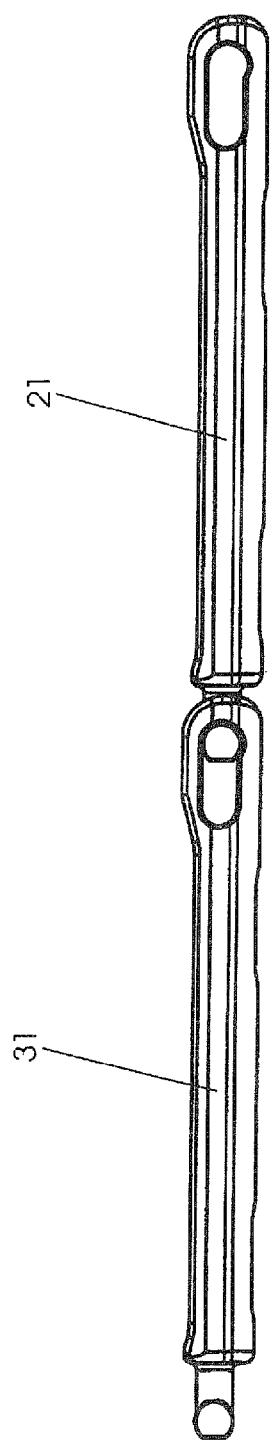

In the embodiment of FIG. 5, the rod segment 31 has an L-shaped coupling mouth 30. The coupling mouth 30 is arranged in relation to the transverse recess 38 in such a way that the stop ridge 36 must be initially rotated by 90° after insertion into the coupling mouth before it is subsequently shifted into the transverse recess 38. This means that as soon as the stop ridge 36 has reached its deepest insertion position in the coupling mouth 30 and, thus, touches with the flat area 33 the longitudinal ridge 34, the rod segment is, accordingly, axially rotated by 90° and then shifted along the axis of the rod segment into the end position in accordance with FIG. 6. This is possible due to the flat area 33. The two rod segments 21, 31 are now pivoted out of the 90° angular position and securely connected to each other as long as they are not positioned in the 90° position. This is because the geometry of the stop ridge 36 allows for leaving the transverse recess 38 only if the flat area 33 is positioned in the plane of the longitudinal ridge 34. The rod segments can be pivoted against each other, for example out of the angular position in accordance with FIG. 6 and into an extended operational position in accordance with FIG. 7, and are, even in the intermediate angular positions, connected to each other with essentially no play.

What is claimed is:

1. A coupling system for boring rod segments, comprising:
a plurality of rigid boring rod segments, each of the boring rod segments having a first end including a first wall defining a first recess formed therein, and a second end including a second wall defining a second recess formed therein;
a sacrificial element having first and second coupling ends, the first coupling end defining a first journal removably engaged with the first recess of a boring rod segment and the second coupling end defining a second journal removably engaged with the second recess of another boring rod segment for connecting the boring rod segments;
wherein the first journal of the first coupling end is shaped such that it is insertable into the first recess when oriented in a first angular position, translatable along a first portion of the first recess in an axial direction of the boring rod segment and into a second portion of the first recess, and constrained from motion in the axial direction of the boring rod segment in the second portion of the first recess when oriented in a second angular position distinct from the first angular position;
wherein the second journal of the second coupling end is shaped such that it is insertable into the second recess when oriented in a first angular position, translatable along a first portion of the second recess in an axial direction of the boring rod segment and into a second portion of the first recess, and constrained from motion in the axial direction of the boring rod segment in the second portion of the second recess when oriented in a second angular position distinct from the first angular position.

2. The coupling system according to claim 1, wherein the first coupling end of the sacrificial element is constructed as one of a sphere and a partial sphere.

3. The coupling system according to claim 2, wherein the first coupling end has at least one flat area.

4. The coupling system according to claim 3, wherein the first portion of the first recess includes a flat wall, and wherein the second portion of the first recess comprises a spherical profile complementary to the sphere or partial sphere of the first coupling end.

5. The coupling system according to claim 1, wherein the first coupling end of the sacrificial element is fixated in the second portion of the first recess.

6. The coupling system according to claim 5, wherein the first coupling end is fixated in the second portion of the first recess against pivoting by one of form-fitting, material union, and interference fit.

7. The coupling system according to claim 6, wherein the sacrificial element is fixated with at least one damper arranged in the first recess.

8. The coupling system according to claim 1, wherein each first end of the boring rod segments further comprises a third opening formed therein, the third opening formed generally perpendicular to the first recess for permitting insertion of the first coupling end into the first recess when oriented in the first angular position.

9. The coupling system of claim 1, wherein the first coupling end is constrained to rotation about a first axis oriented generally perpendicular to the axial direction of the rod segment when arranged in the second portion of the first recess.

10. The coupling system of claim 9, wherein the first journal is defined about an axis, and wherein the axis of the first journal is aligned with the first axis oriented generally perpendicular to the axial direction of the rod segment when arranged in the second portion of the first recess.

11. The coupling system of claim 10, wherein the first journal comprises a partially circular profile defined about its axis.

12. The coupling system of claim 1, wherein the second coupling end is constrained to rotation about a second axis oriented generally perpendicular to the axial direction of the rod segment and a third axis oriented generally perpendicular to the second axis and the axial direction of the rod segment when arranged in the second portion of the second recess.

13. The coupling system of claim 1, wherein the first and second walls comprise portions of a continuous wall of a boring rod segment.

* * * * *